United States Patent
Karimli et al.

(10) Patent No.: US 9,756,179 B1
(45) Date of Patent: Sep. 5, 2017

(54) MULTIPLE DEVICE AND MULTIPLE LINE CONNECTED HOME AND HOME MONITORING

(71) Applicant: T-Mobile USA, Inc., Bellevue, WA (US)

(72) Inventors: Yasmin Karimli, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/062,964

(22) Filed: Mar. 7, 2016

(51) Int. Cl.
H04W 8/10 (2009.01)
H04M 3/42 (2006.01)
H04L 29/12 (2006.01)

(52) U.S. Cl.
CPC ........ H04M 3/42255 (2013.01); H04L 61/30 (2013.01); H04W 8/10 (2013.01)

(58) Field of Classification Search
CPC ...... H04M 3/42255; H04L 61/30; H04W 8/10
USPC ....................................... 455/435.1; 709/223
See application file for complete search history.

(56) References Cited

U.S. PATENT DOCUMENTS

| 7,474,889 | B2 * | 1/2009 | Bhakta | H04W 88/02 455/412.1 |
|---|---|---|---|---|
| 7,539,293 | B2 * | 5/2009 | Jones | H04M 11/06 379/102.01 |
| 8,738,072 | B1 * | 5/2014 | Messerian | H04M 1/7253 348/14.02 |
| 2002/0165969 | A1 * | 11/2002 | Gallant | H04L 12/14 709/227 |
| 2004/0068567 | A1 * | 4/2004 | Moran | H04L 67/14 709/227 |
| 2012/0182920 | A1 * | 7/2012 | Maeng | H04L 12/2832 370/312 |
| 2013/0195102 | A1 * | 8/2013 | Kyle | H04L 12/66 370/352 |
| 2014/0211791 | A1 * | 7/2014 | Cadiz | H04M 1/2473 370/352 |
| 2015/0281914 | A1 * | 10/2015 | Kamma | H04W 4/06 455/416 |

* cited by examiner

*Primary Examiner* — Nathan Taylor
(74) *Attorney, Agent, or Firm* — Lee & Hayes, PLLC

(57) ABSTRACT

Systems, devices, and techniques for multiple device and multiple line enabled computing devices and computing appliances are described herein. A device number can be assigned to a computing device and can be unique to the computing device. A plurality of alias numbers can be provided to the computing device and enabled for use by the computing device. Alias numbers can be enabled on multiple computing appliances, such that a user can transfer voice or video calls between devices using the alias numbers. Further, monitoring components in a home environment, for example, can be associated with one or more alias number so that security alerts can be provided to the various computing devices and computing appliances associated with the alias numbers.

17 Claims, 6 Drawing Sheets

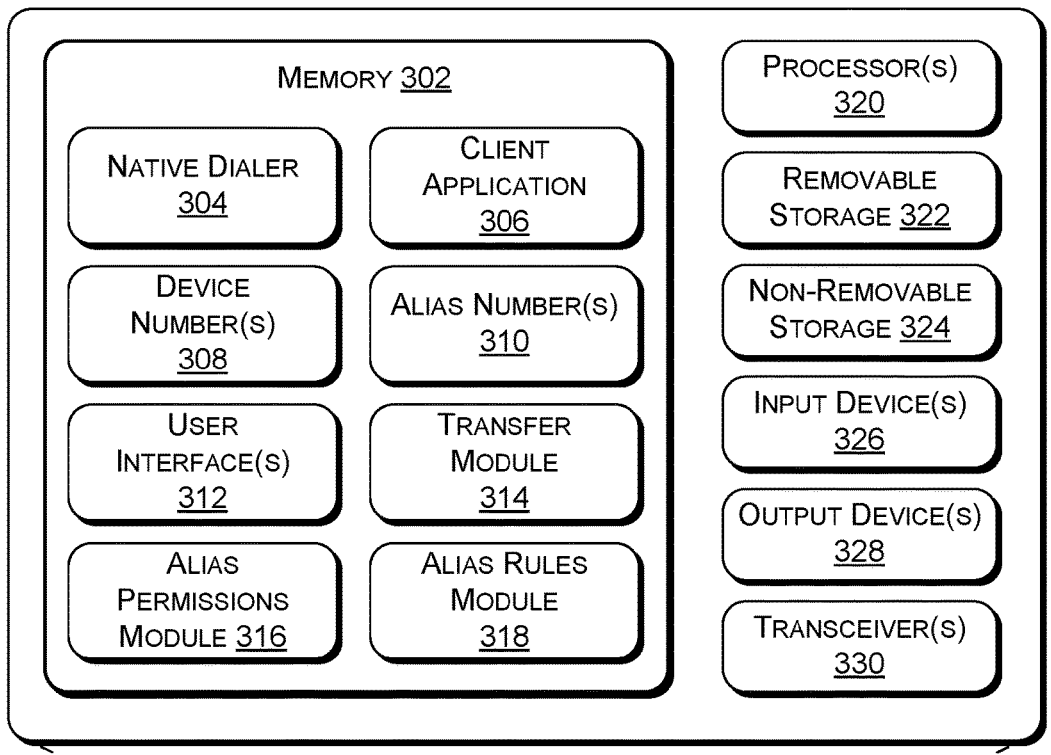
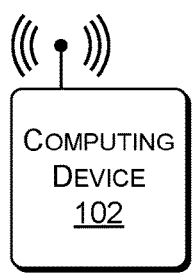
FIG. 3

MULTIPLE DEVICE AND MULTIPLE LINE CONNECTED HOME AND HOME MONITORING

BACKGROUND

A computing device, such as a wireless phone, that is capable of terminating (e.g., receiving) or originating phone calls is typically associated with one particular phone number. The computing device can only terminate phone calls whose called number is the particular phone number. Thus, someone with, for example, multiple businesses can have to carry multiple computing devices, because each of the computing devices is associated with a different phone number. Not only is this cumbersome for the user, but wasteful because the user has to acquire multiple computing devices, one computing device per phone number.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example computing device configured with the multiple device and multiple line functionality, in accordance with embodiments of the disclosure.

DETAILED DESCRIPTION

Figure 1:
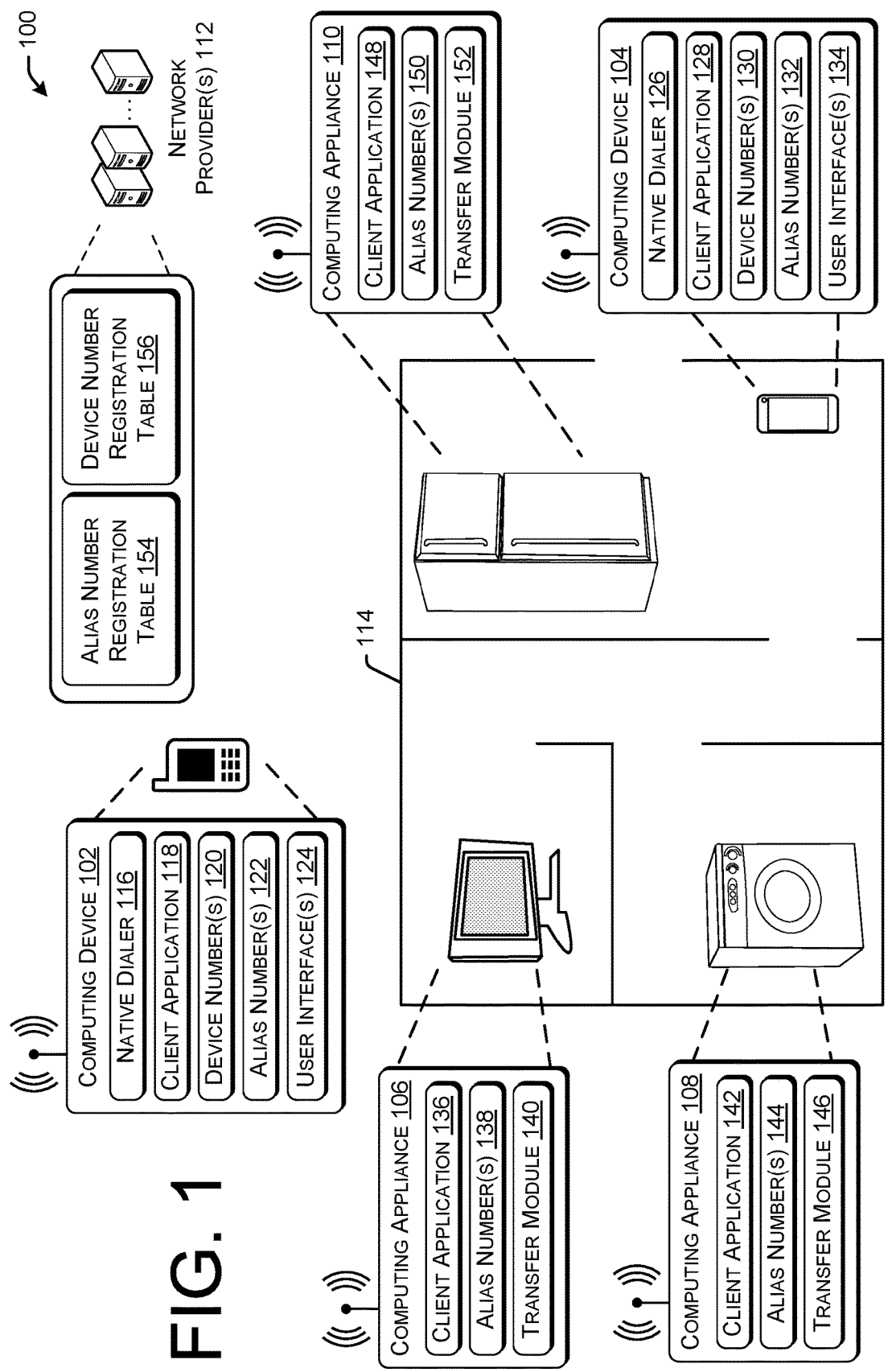
FIG. 1 illustrates an example environment in which multiple device and multiple line enabled computing devices and computing appliances can initiate and transfer communications, in accordance with embodiments of the disclosure.

The systems, devices, and techniques described herein present frameworks for routing audio and/or video calls within a multiple device and multiple line environment, as well as extending the environment to provide home monitoring.

When a user acquires a computing device, such as a wireless phone, a wireless service provider or network provider can assign an International Mobile Subscriber Identity (IMSI) and/or an E.164 address (e.g., up to a fifteen digit telephone number) that is specific for the user associated with the computing device. As used herein, a "device number" is the E.164 address or identity assigned (such as an IMSI, or a Mobile Station International Subscriber Directory Number, MSISDN) to the computing device by the wireless service provider or network provider.

Computing devices can be associated with one or more additional alias numbers that can be activated or installed at various computing devices and/or computing appliances. For example, a first computing device can be associated with a first device number and various alias numbers (e.g., Alias #1, Alias #2, Alias #3, etc.), while a second computing device can be associated with a second device number and various alias number (e.g., Alias #1, Alias #2, Alias #4, etc.). Thus, the first computing device and the second computing device represent the multiple device and multiple line functionality described herein, whereby a single number can be associated with multiple devices, and whereby a single device can be associated with multiple lines. Further, computing appliances can be configured with client applications supporting one or more alias numbers (e.g., Alias #1, Alias #2, Alias #3, Alias #4, etc.).

A communication (e.g., a voice call, a video call, SMS, MMS, etc.) can be initiated at a computing device via the device number associated with the computing device or via an alias number. Considering an implementation in a home context, a user can initiate a voice call on a computing device and may wish to transfer the call to another computing device or computing appliance located throughout the home of the user. The user can configure the communication to remain on the same line (e.g., associated with the device number) or can configure the communication to switch to a new line (e.g., associated with another device number or an alias number). The user can initiate the transfer on the computing device and can use a transfer module at a computing appliance (e.g., via a graphical user interface presented on a display or via a voice interface presented using an audio system) to pick up the call as the user moves about the home. Thus, the user can extend the functionality of the multiple device and multiple line environment to transfer communications between various computing devices and/or computing appliances configured to interface with the various device numbers and/or alias numbers.

It can be understood in the context of this disclosure that device numbers and alias numbers can be associated with any number of computing devices and/or computing appliances. In some embodiments, a network provider can maintain registration tables associating the various device numbers and alias numbers with various computing devices and computing appliances. Thus, the network provider can route communications according to the registration tables as described herein. Further, communications can be initiated on computing devices or computing appliances, using one or more device numbers and/or alias numbers. Communications can be transferred among any device numbers and/or alias numbers, as described herein.

Various monitoring components (e.g., home security components) can be integrated into the multiple device and multiple line environment to provide monitoring capabilities. For example, a home can be equipped with a video conferencing system that is associated with one or more alias numbers. By way of example, when the video conferencing system is operated, a video camera and/or intercom can route a communication (e.g., an IR.94 IMS conservational video communication) to one or more computing devices and/or computing appliances associated with the alias numbers. Thus, when the video camera is initiated, the video call can be routed to multiple computing devices, for example, such that any one of the multiple computing devices can receive the video call. In some embodiments, unique rules can be associated with the various monitoring components. By way of example, a picture message (e.g., MMS) can be sent to particular device numbers or alias numbers when a doorbell is activated, while a text message can be sent to another set of device numbers or alias numbers when a window sensor is activated. Thus, the multiple device and multiple line functionality can be incorporated with monitoring components to provide home security, for example.

In this manner, the systems, devices, and techniques described herein improve a functioning of a computing device by optimizing communication routing to desired computing devices and computing appliances. For example, the systems, devices, and techniques described herein can reduce duplicative devices and enable communications to be received at devices without being constrained to a particular device.

The systems, devices, and techniques described herein can be implemented in a number of ways. Example implementations are provided below with reference to the following figures.

FIG. 1 illustrates an example environment 100 in which multiple device and multiple line enabled computing devices and computing appliances can initiate and transfer communications, in accordance with embodiments of the disclosure. In some embodiments, communications (e.g., voice and/or video data) can be initiated and transferred between the various computing devices 102 and 104 and various computing appliances 106, 108, and 110, in accordance with the routing provided by network provider(s) 112.

In general, a communication can be initiated via any one of the computing devices 102 and 104 and the computing appliances 106, 108, and 110. In one example, if a user initiates a communication using the computing appliance 106 and an alias number, the user can transfer the communication to another computing appliance associated with the alias number, such as the computing appliance 110, as the user moves throughout the location 114.

The computing devices 102 and 104 can be any sort of device capable of engaging in wired or wireless communication with other, remote devices. Thus, computing devices 102 and 104 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Example networks carrying calls include second-generation (2G), 3G, or fourth-generation (4G) cellular networks, such as LTE (Long Term Evolution) via VoLTE (Voice Over LTE) using SIP (Session Initiation Protocol) signaling, and data networks, such as Wi-Fi networks carrying VoIP (Voice Over Internet Protocol) calls.

In some embodiments, the computing device 102 can include a native dialer 116, a client application 118, device number(s) 120, alias number(s) 122, and user interface(s) 124. In some embodiments, the native dialer 116 can be an application that enables calls to be originated via Voice over Internet Protocol (VoIP), circuit switched voice, or some other protocol, using Session Initiation Protocol (SIP) signaling. In some embodiments, the native dialer 116 can be configured to initiate communications using the device number(s) 120. In some embodiments, the device number(s) 120 can correspond to an E.164 address or identity assigned (such as an IMSI) to the computing device by the network provider 112. For example, the device number 120 can correspond to a phone number such as "555-111-2222".

In some embodiments, the client application 118 can permit a user to initiate or terminate calls for other phone numbers in addition to the device number(s) 120. For example, the client application 118 can enable communications using the alias number(s) 122. In some embodiments, the alias numbers 122 can include phone numbers or other identifiers allocated by the network provider 112 for use in connection with the device numbers 120. However, in some embodiments, the alias numbers 122 are not associated with any computing devices (e.g., via a Subscriber Identity Module, SIM card, or via a Removable User Identity Module, R-UIM, etc.) or computing appliances until a particular alias number is activated for use at the computing device or computing appliance. Thus, a user can use the client application 118 to activate the alias number 122 at the computing device 102, for example, and the client application 118 can be used to initiate calls and transfer calls to and from the various alias numbers 122. Further, the client application 118 or another application or interface provided by the network provider 112 can permit the user to select, enter, or view the alias numbers 122, or to add descriptions for the alias numbers, such as "personal," "work," "school," "refrigerator," "television," "smart mirror," etc.

In some embodiments, the user interfaces 124 can include any displays, haptic feedback or input, and/or audio systems to interface with the computing device 102. For example, the user interface 124 can initiate a call via the native dialer 116 and/or the client application 118, transfer a call to another computing device or computing appliance, and receive a call from the environment 100.

In some embodiments, the computing device 104 can include a native dialer 126, a client application 128, device number(s) 130, alias number(s) 132, and user interface(s) 134. In some embodiments, the components of the computing device 104 can include similar capabilities and features as discussed in connection with the computing device 102. In some embodiments, the device numbers 130 can be unique to the computing device 104, for example, and the device number 130 can correspond to a phone number such as "555-111-3333". In some embodiments, the alias numbers 132 can substantially overlap with the alias numbers 122. For example, and without limitation, the alias numbers 132 can correspond to phone numbers such as "555-222-1111", "555-222-2222", "555-222-3333", while the alias numbers 122 can correspond to phone numbers such as "555-222-1111" and "555-222-4444".

The computing appliances 106, 108, and 110 can be any sort of device capable of engaging in wired or wireless communication with other, remote devices. Thus, the computing appliances 106, 108, and 110 can include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network. In some embodiments, the computing appliances 106, 108, and 110 can be considered to be a part of the "Internet of Things," whereby appliances are enabled to collect and exchange data.

The computing appliance 106 can include a client application 136, alias number(s) 138, and a transfer module 140. In some embodiments, the client application 136 can be downloaded and installed on the computing appliance 106, and in some embodiments, the client application 136 can be installed by a manufacturer of the computing appliance 106 and activated by a user. In some embodiments, the client application 136 can substantially correspond to the client application 118, and can enable communications at the computing appliance 106 over the alias numbers 138. In some embodiments, user interaction with the client application 118 on the computing device 102 can enable the alias numbers 138 on the computing appliance 106. In some embodiments, the alias numbers 138 can correspond to phone numbers that have been selected and enabled for association with the computing appliance 106, and can correspond to phone numbers such as "555-222-1111", "555-222-2222", "555-222-5555". That is to say, the alias numbers 138 can overlap with some alias numbers associated with various computing devices and computing appliances in the environment 100, and can include alias numbers unique to the computing appliance 106. In some embodiments, the alias number can include Internet Protocol (IP) addresses, and or other identifiers to identify the computing devices and computing appliances via a network.

In some embodiments, the transfer module 140 can include one or more user interfaces such as a graphical user interface, various input devices (such as a keyboard or remote control device), and/or an audio interface system. For example, a user can use one or more interfaces of the transfer module 140 to initiate communications and/or to initiate or receive transfers to or from other devices or appliances. In some embodiments, the user interfaces of the transfer module 140 can be used to select and/or enable the alias numbers 138 to be associated with the computing appliance 106.

The computing appliance 108 can include a client application 142, alias number(s) 144, and a transfer module 146. The computing appliance 108 can include a client application 148, alias number(s) 150, and a transfer module 152. In some embodiments, the functions and capabilities of the computing appliances 106, 108, and 110 can substantially correspond to each other, with respect to the multiple device and multiple line features discussed herein.

In some embodiments, the alias number 144 can correspond to phone numbers that have been selected and enabled for association with the computing appliance 108, and can correspond to phone numbers such as "555-222-1111", "555-222-2222", "555-222-6666". That is to say, the alias numbers 144 can overlap with some alias numbers associated with various computing devices and computing appliances in the environment 100, and can include alias numbers unique to the computing appliance 108.

In some embodiments, the alias numbers 150 can correspond to phone numbers that have been selected and enabled for association with the computing appliance 110, and can correspond to phone numbers such as "555-222-1111", "555-222-7777". That is to say, the alias numbers 150 can overlap with some alias numbers associated with various computing devices and computing appliances in the environment 100, and can include alias numbers unique to the computing appliance 110.

The network provider(s) 112 includes an alias number registration table 154 and a device number registration table 156. For example, the alias number registration table 154 can register the various alias numbers in the environment 100 and associate the alias numbers with one or more computing devices 102 and 104 and/or with one or more computing appliances 106, 108, and 110. Further, the alias number registration table 154 can include alias numbers that are not yet activated, enabled, or associated with any devices or appliances. In some embodiments, when an alias number is enabled or activated at the computing device 104, for example, the computing device 104 can transmit an indication of the alias number registration to the alias number registration table 154, thereby associating a particular alias number with a particular computing device.

In some embodiments, the device number registration table 156 can register the various device numbers in the environment 100 and associate the device numbers with one or more computing devices 102 and 104 and/or with one or more computing appliances 106, 108, and 110. In some embodiments, when a device number is enabled or activated at the computing appliance 106, for example, the computing appliance 106 can transmit an indication of the device number registration to the device number registration table 156, thereby associating a particular device number with a particular computing appliance (or computing device). An example of the network provider 112 is discussed below in connection with FIGS. 2 and 4.

In some embodiments, the network provider 112 can route communications over a network using the alias number registration table 154 and/or the device number registration table 156. For example, if a call is initiated at the computing device 102 using the device number 120 (e.g., "555-111-2222"), the call can be transferred to one or more of the alias numbers registered in the alias number registration table 154. For example, a user can indicate at the user interface 124 that the call is to be transferred to all devices associated with the alias number "555-222-2222". In this example, the computing device 102, the computing appliance 106, and the computing appliance 108 are each associated with the alias number "555-222-2222", and thus, each of the respective devices and appliances would receive an indication of the call to be transferred. For example, the transfer indication can include one or more audible, visual, and/or haptic indications coupled with a period to receive input from a user to accept the transfer indication. In some embodiments, the transfer indication may not be outwardly detectable (e.g., by a user), but can provide an indication to a computing device or computing appliance that a call is available. In the event that transfer module 140 accepts the transferred call, the call originating at the computing device 102 can be transferred to the computing appliance 106, in accordance with embodiments of the disclosure.

Figure 2:
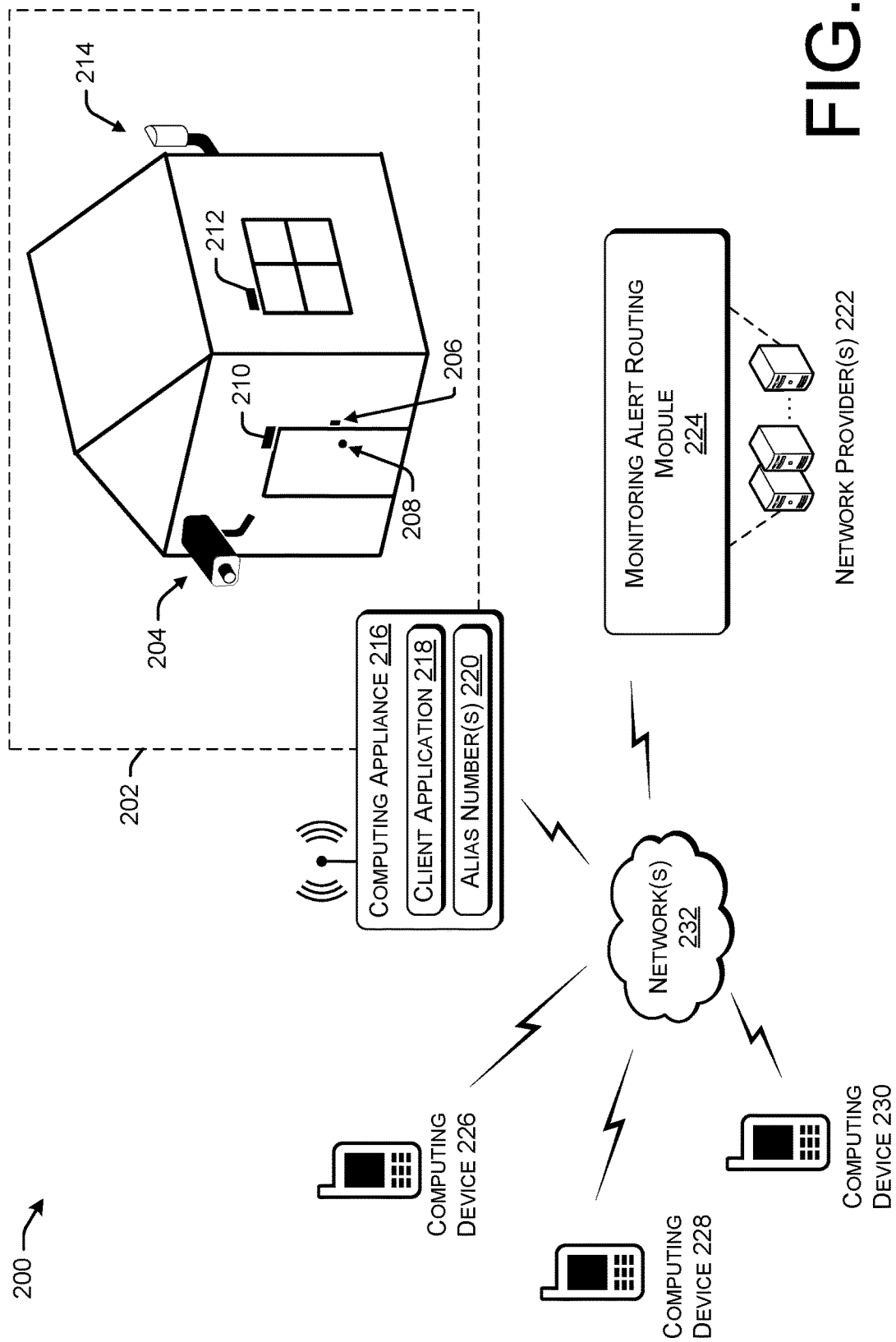
FIG. 2 illustrates an example environment in which home monitoring is provided by extending the functionality of the multiple device and multiple line environment, in accordance with embodiments of the disclosure.

FIG. 2 illustrates an example environment 200 in which home monitoring is provided by extending the functionality of the multiple device and multiple line environment, in accordance with embodiments of the disclosure.

For example, a monitoring location 202 can include one or more monitoring components such as components 204, 206, 208, 210, 212, and/or 214. In some embodiments, the component 204 can correspond to a video intercom system or a video camera. In some embodiments, the component 206 can correspond to a doorbell or a video or audio intercom system. In some embodiments, the component 208 can correspond to a doorknob and/or remote door lock system. In some embodiments, the component 210 can correspond to a sensor for a door, for example, indicating whether the door is open or closed. In some embodiments, the component 212 can correspond to a sensor for a window, for example, indicating whether the window is open or closed. In some embodiments, the component 214 can correspond to a motion detector or an infrared sensor. As can be understood in the context of this disclosure, the monitoring location 202 can include any number of components inside or outside of the monitoring location 202 to sense a variety of conditions and/or to collect a variety of data.

In some embodiments, the monitoring location 202 can include a computing appliance 216 that can centrally monitor the components 204-214, for example. In some embodiments, each of the components 204-214 can include an associated computing appliance (such as the computing appliance 216).

The computing appliance 216 can include a client application 218 and alias number(s) 220. In some embodiments, the computing appliance 216 can include a transfer module, as illustrated in FIG. 1. In some embodiments, the client application 218 can substantially correspond to the client application 118 of FIG. 1, for example. That is to say, the client application 218 can monitor the components 204-214 and can call one or more particular alias numbers 220. In some embodiments, individual components 204-214 can be associated with unique alias numbers, such that a first alias number is called based on an indication from the component 204 and a second alias number is called based on an indication from the component 212. In some embodiments, one or more components can be associated with an individual alias number.

Network provider(s) 222 can include a monitoring alert routing module 224. In some embodiments, the monitoring alert routing module 224 can receive calls (i.e., alerts) from the computing appliance 216 and can route the alert according to one or more rules, preferences, type of alert, severity of alert, etc. For example, the monitoring alert routing module 224 can receive an alert (e.g., a call or a communication) from the component 204 (e.g., a video intercom) and can route the alert to one or more computing devices 226, 228, and/or 230 via the network(s) 232.

By way of example, in some embodiments, when a door bell is activated (e.g., via the component 206) the computing appliance 216 can call a particular alias number of the alias numbers 220 associated with the component 206. In some embodiments, the network provider 222 can route the communication to an individual computing device, simultaneously to a plurality of computing devices, or can cycle through an ordered sequence of computing devices (e.g., by alerting computing device 226, waiting for a connection, then alerting computing device 228, waiting for a connection, and so on). In some embodiments, when the computing device 226 receives a communication from the component 206, after a discussion between users associated with the devices (e.g., in the case where the component 206 is an intercom system), the computing device 226 can transmit an indication to the remote door lock (e.g., via the component 208) to unlock and/or open the door. As can be understood in the context of this disclosure, the computing device 226 can transfer the communication in accordance with embodiments of the disclosure.

In some embodiments, the network(s) 232 can comprise a mobile telecommunications network (MTN) configured to implement one or more of the second, third, and fourth generation (2G, 3G, and 4G) cellular-wireless access technologies discussed above. Thus, the MTN can implement GSM, UMTS, and/or LTE/LTE Advanced telecommunications technologies. Further, the network providers 112 and 222 implementing the GSM, UMTS, LTE, LTE Advanced, and/or HSPA+telecommunications technologies can include, but are not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), or any other data traffic control entity configured to communicate, convert, and/or route data packets between the computing devices 102, 104, 226, 228, and 230, the computing appliances 106, 108, 110, and 216, and/or the network providers 112 and 222. While FIGS. 1 and 2 illustrate the network providers 112 and 222, it is understood in the context of this disclosure that the techniques discussed herein can also be implemented in other networking technologies, such as nodes that are part of a wide area network (WAN), metropolitan area network (MAN), local area network (LAN), neighborhood area network (NAN), personal area network (PAN), or the like.

FIG. 3 illustrates an example computing device 300 configured with the multiple device and multiple line functionality, in accordance with embodiments of the disclosure. In some embodiments, the computing device 300 can correspond to the computing devices 102, 104, 226, 228, and 230 of FIGS. 1 and 2. As illustrated, the computing device 300 comprises a memory 302 storing a native dialer 304, a client application 306, device number(s) 308, alias number(s) 310, user interface(s) 312, a transfer module 314, an alias permissions module 316, and an alias rules module 318. Also, the computing device 300 includes processor(s) 320, a removable storage 322 and non-removable storage 324, input device(s) 326, output device(s) 328, and transceiver(s) 330. In some embodiments, the computing device 300 can include a microphone, a camera, a GPS, an electronic compass, a heat sensor, biometric sensors, chemical sensors, accelerometer(s), gyroscope(s), pressure sensor(s) and/or photometers.

In various embodiments, memory 302 is volatile (such as RAM), non-volatile (such as ROM, flash memory, etc.) or some combination of the two. The native dialer 304, the client application 306, the device number(s) 308, the alias number(s) 310, the user interface(s) 312, the transfer module 314, the alias permissions module 316, and the alias rules module 318 stored in the memory 302 can comprise methods, threads, processes, applications or any other sort of executable instructions. The native dialer 304, the client application 306, the device number(s) 308, the alias number(s) 310, the user interface(s) 312, the transfer module 314, the alias permissions module 316, and the alias rules module 318 can also include files and databases.

In some embodiments, the native dialer 304, the client application 306, the device number(s) 308, the alias number(s) 310, the user interface(s) 312, and the transfer module 314 can correspond to the native dialer 116, the client application 118, the device number(s) 120, the alias number(s) 122, the user interface(s) 124, and the transfer module 140, for example, of FIG. 1. In some embodiments, the module operations in the computing device 300 can be performed in parallel with the module operations in the network provider 112, for example. In some embodiments, various modules can be used to check the processing determined by the other modules.

In some embodiments, the alias permissions module 316 can determine whether an alias number can be activated or enabled on a variety of computing devices or computing appliances. For example, the alias permissions module 316 can activate an alias number at a computing device, and can indicate whether other computing devices or computing appliances can be associated with that number. By way of example, a user at the computing device 102 can activate an alias number and can restrict or otherwise control permissions on which computing devices and computing appliances utilize the alias number. In some embodiments, the alias permissions module 316 can include administrative privileges that can accept or deny requests to associate an alias number with a particular device or appliance. For example, the computing appliance 106 may initiate an association of a particular alias number with the computing appliance 106, while the alias permission module 316 can approve or deny permission to associate the alias number with the computing appliance 106.

In some embodiments, the alias rules module 318 can set rules for communicating via one or more alias numbers. For example, the alias rules module 318 can restrict communications to a particular format (e.g., voice, video, SMS, MMS, etc.), or can determine and enforce rules indicating a calling order associated with the alias numbers. For example, in some embodiments, a rule can determine whether one, some, or all computing devices or computing appliances associated with the alias number can be called simultaneously or serially in a particular order. In some embodiments, the order can be set by the alias rules module 318.

In some embodiments, the processor(s) 320 is a central processing unit (CPU), a graphics processing unit (GPU), or both CPU and GPU, or other processing unit or component known in the art.

The computing device 300 also includes additional data storage devices (removable and/or non-removable) such as, for example, magnetic disks, optical disks, or tape. Such additional storage is illustrated in FIG. 3 by removable storage 322 and non-removable storage 324. Tangible computer-readable media can include volatile and nonvolatile, removable and non-removable media implemented in any method or technology for storage of information, such as computer readable instructions, data structures, program modules, or other data. Memory 302, removable storage 322 and non-removable storage 324 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the computing device 300. Any such tangible computer-readable media can be part of the computing device 300.

Computing device 300 can include input device(s) 326, such as a keypad, a cursor control, a touch-sensitive display, a microphone, etc. Also, the computing device 300 can include output device(s) 328, such as a display, speakers, etc. These devices are well known in the art and need not be discussed at length here.

As illustrated in FIG. 3, the computing device 300 can include one or more wired or wireless transceiver(s) 330. In some wireless embodiments, to increase throughput, the transceiver(s) 330 can utilize multiple-input/multiple-output (MIMO) technology. The transceiver(s) 330 can be any sort of wireless transceivers capable of engaging in wireless, radio frequency (RF) communication. The transceiver(s) 330 can also include other wireless modems, such as a modem for engaging in Wi-Fi, WiMax, Bluetooth, or infrared communication.

Figure 4:
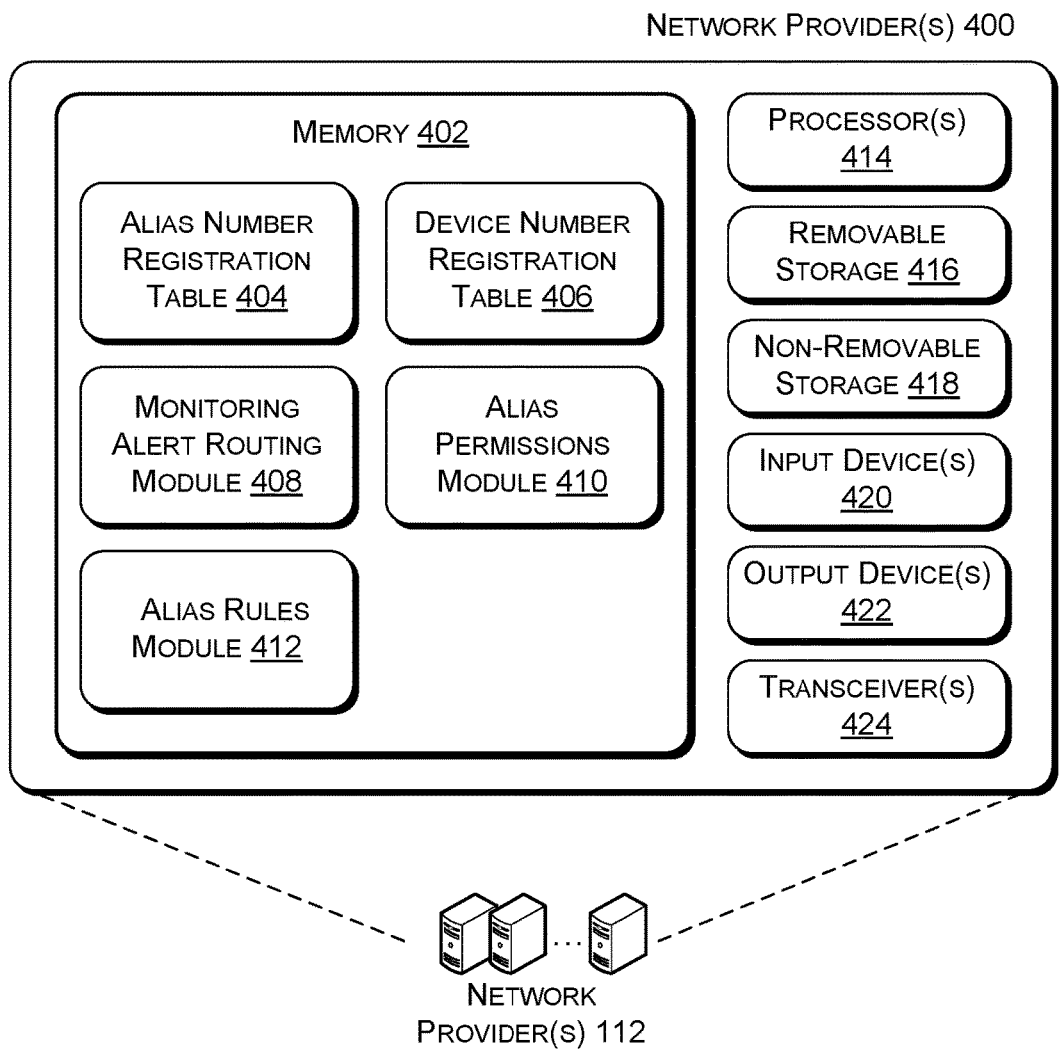
FIG. 4 illustrates an example network provider configured to operate in the multiple device and multiple line environment, in accordance with embodiments of the disclosure.

FIG. 4 illustrates an example network provider 400 configured to operate in the multiple device and multiple line environment, in accordance with embodiments of the disclosure. In some embodiments, the network provider 400 can correspond to the network providers 112 or 222 of FIGS. 1 and 2. It is to be understood in the context of this disclosure that the network provider 400 can be implemented as a single device or as a plurality of devices with modules and data distributed among them. For example, an alias number registration table 404, a device number registration table 406, a monitoring alert routing module 408, an alias permissions module 410, and/or an alias rules module 412 can be implemented on different devices 400 of the network provider 112. In some embodiments, the alias number registration table 404, the device number registration table 406, and the monitoring alert routing module 408 can correspond to the alias number registration table 154, the device number registration table 156, and the monitoring alert routing module 224 of FIGS. 1 and 2.

As illustrated, the network provider 400 comprises a memory 402 storing the alias number registration table 404, the device number registration table 406, the monitoring alert routing module 408, the alias permissions module 410, and the alias rule modules 412. Also, the network provider 400 includes processor(s) 414, a removable storage 416 and non-removable storage 418, input device(s) 420, output device(s) 422, and transceiver(s) 424.

In various embodiments, memory 402 is volatile (such as RAM), non-volatile (such as ROM, flash memory, etc.) or some combination of the two. The alias number registration table 404, the device number registration table 406, the monitoring alert routing module 408, the alias permissions module 410, and the alias rule module 412 stored in the memory 402 can comprise methods, threads, processes, applications or any other sort of executable instructions. The alias number registration table 404, the device number registration table 406, the monitoring alert routing module 408, the alias permissions module 410, and the alias rules module 412 can also include files and databases. Further descriptions of the alias number registration table 404, the device number registration table 406, and the monitoring alert routing module 408 are provided above in connection with the alias number registration table 154, the device number registration table 156, and the monitoring alert routing module 224 of FIGS. 1 and 2.

The alias permissions module 410 can determine whether alias numbers can be activated or enabled on a variety of computing devices or computing appliances. For example, the alias permissions module 410 can activate an alias number at a computing device, and can indicate whether other computing devices or computing appliances can be associated with that number. By way of example, a user at the computing device 102 can activate an alias number and can restrict or otherwise control permission on which computing devices and computing appliances utilize the alias number. In some embodiments, the alias permission module 410 can include administrative privileges that can accept or deny requests to associate an alias number with a particular device or appliance. For example, the computing appliance 106 may initiate an association of a particular alias number with the computing appliance 106, while the alias permissions module 410 can approve or deny permission to associate the alias number with the computing appliance 106.

The alias rules module 412 can set rules for communicating via one or more alias numbers. For example, the alias rules module 412 can restrict communications to a particular format (e.g., voice, video, SMS, MMS, etc.), or can determine and enforce rules indicating a calling order associated with the alias numbers. For example, in some embodiments, a rule can determine whether one, some, or all computing devices or computing appliances associated with the alias number can be called simultaneously or serially in a particular order. In some embodiments, the order can be set by the alias rules module 412.

In some embodiments, the processor(s) 414 is a central processing unit (CPU), a graphics processing unit (GPU), or both CPU and GPU, or other processing unit or component known in the art.

The network provider 400 also includes additional data storage devices (removable and/or non-removable) such as, for example, magnetic disks, optical disks, or tape. Such additional storage is illustrated in FIG. 4 by removable storage 416 and non-removable storage 418. Tangible computer-readable media can include volatile and nonvolatile, removable and non-removable media implemented in any method or technology for storage of information, such as computer readable instructions, data structures, program modules, or other data. Memory 402, removable storage 416 and non-removable storage 418 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the network provider 400. Any such tangible computer-readable media can be part of the network provider 400.

The network provider 400 also can include input device(s) 420, such as a keypad, a cursor control, a touch-sensitive display, a voice input device, etc., and output device(s) 422 such as a display, speakers, printers, etc. These devices are well known in the art and need not be discussed at length here.

Figure 5:
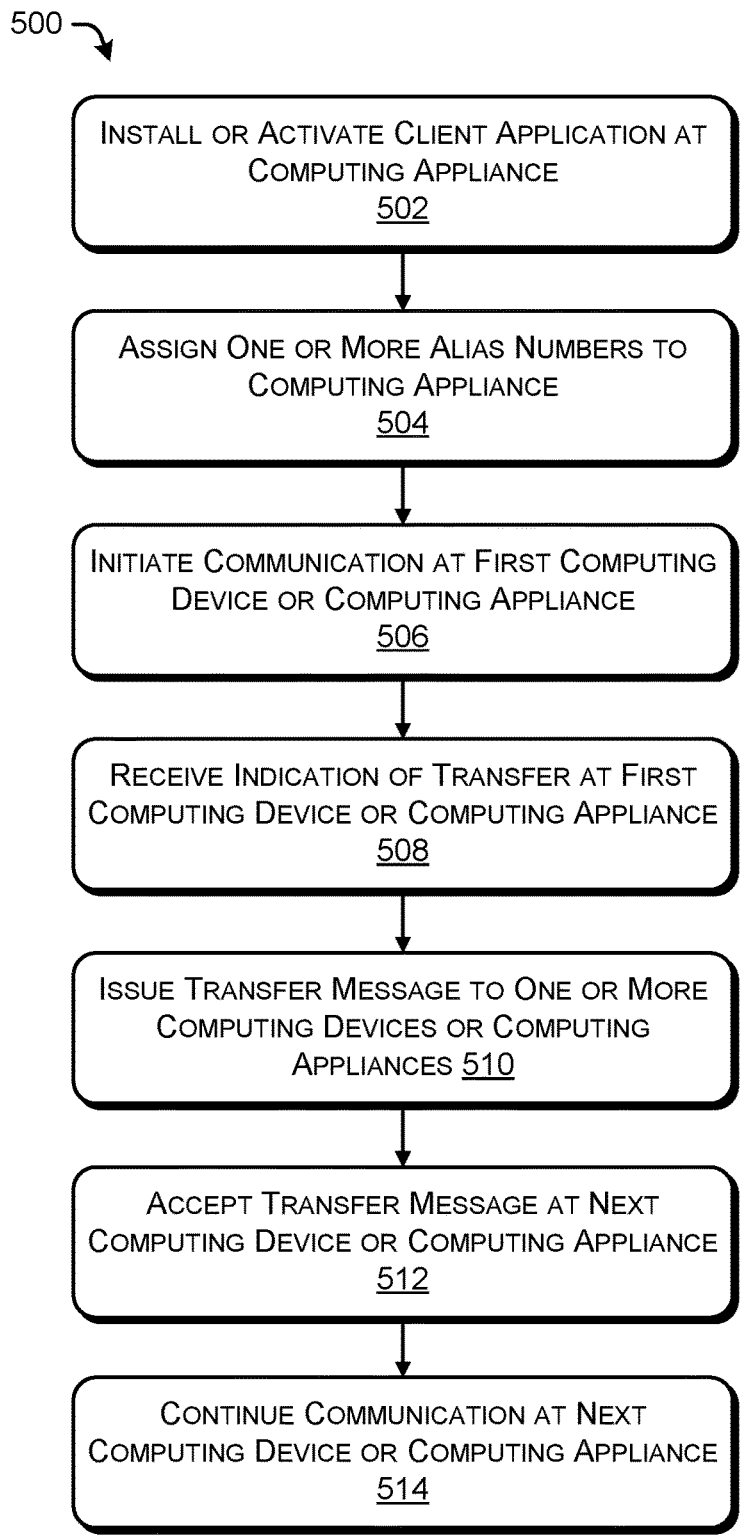
FIG. 5 illustrates an example process for initiating and transferring a communication in the multiple device and multiple line environment, in accordance with embodiments of the disclosure.
Figure 6:
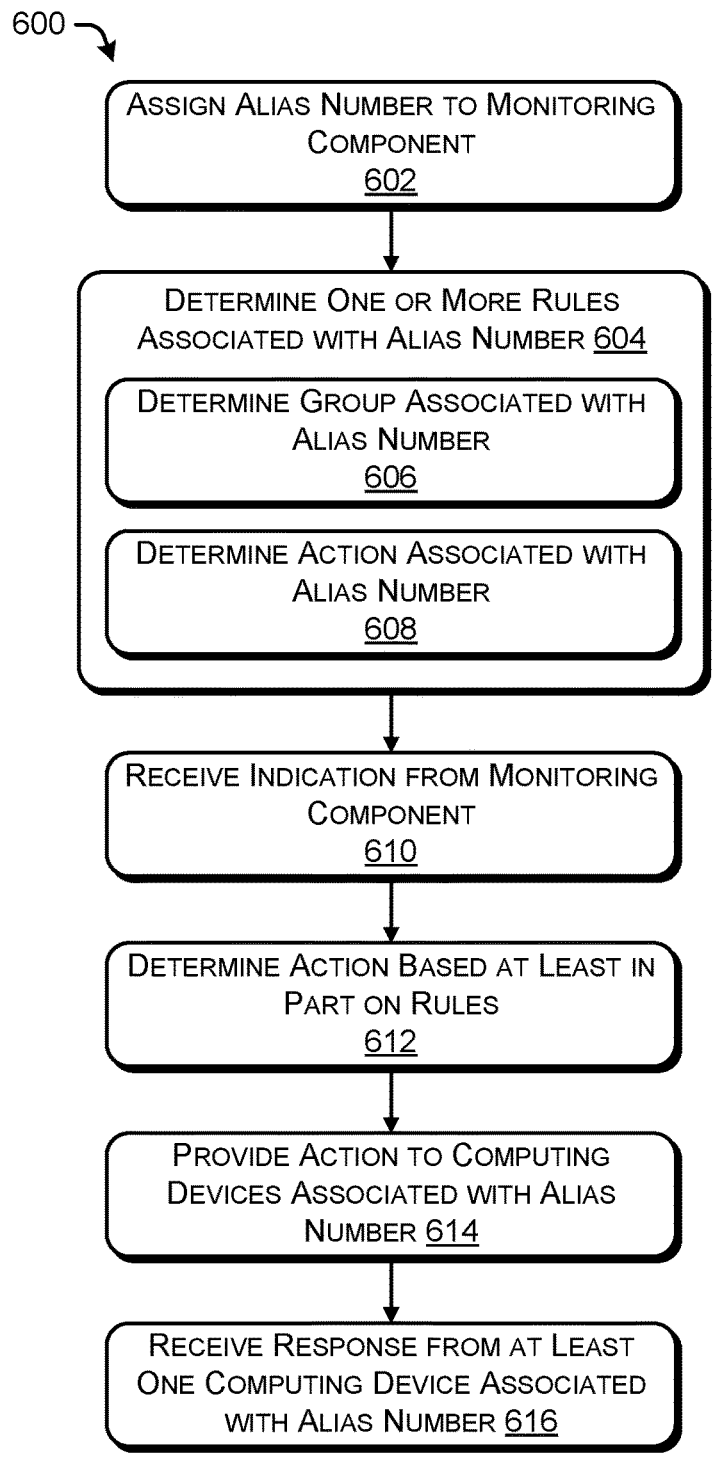
FIG. 6 illustrates an example process for monitoring a home location and providing alerts in the multiple device and multiple line environment, in accordance with embodiments of the disclosure.

As illustrated in FIG. 4, the network provider 400 also includes one or more wired or wireless transceiver(s) 424. For example, the transceiver(s) 424 can include a network interface card (NIC), a network adapter, a LAN adapter, or a physical, virtual, or logical address to connect to the network(s) 232, or to the computing devices 102, 104, 226, 228, and 230, and/or the computing appliances 106, 108, 110, and 216, for example. To increase throughput when exchanging wireless data, the transceivers 424 can utilize multiple-input/multiple-output (MIMO) technology. The transceiver(s) 424 can comprise any sort of wireless transceivers capable of engaging in wireless, radio frequency (RF) communication. The transceivers 424 can also include other wireless modems, such as a modem for engaging in Wi-Fi, WiMax, Bluetooth FIGS. 5 and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 for initiating and transferring a communication in a multiple device and multiple line environment, in accordance with embodiments of the disclosure.

At 502, the operation can include installing or activating a client application at a computing appliance. In some embodiments, a user can download a client application to a computing appliance (or computing device) via a network. In some embodiments, the client application can be pre-installed in the computing appliance or computing device and can be activated to operate in an environment associated with a user.

At 504, the operation can include assigning one or more alias numbers to a computing appliance. In some embodiments, this operation can be performed at the computing appliance, while in some embodiments, this operation can be performed via an administrative interface, such as one associated with a computing device. For example, a user (of a computing device, for example) can select one or more alias numbers for a computing appliance and can "push" that assigned alias number to be associated with the computing appliance. In some embodiments, this operation can include an authentication and/or acceptance procedure to verify permissions that the alias number can be associated with a particular computing appliance and/or computing device.

At 506, the operation can include initiating a communication at a first computing device or a computing appliance. For example, a communication can be initiated using a device number or an alias number, and can include a voice or video call. This operation can include transmitting one or more requests to the network provider to facilitate the communication between communication devices or appliances.

At 508, the operation can include receiving an indication of a transfer at the first computing device or the computing appliance. For example, the indication of the transfer (i.e., a transfer indication) can be received via a user interface (e.g., a GUI, an audio interface, and/or a haptic interface), and can indicate a particular alias number, device number, computing device, and/or computing appliance to transfer the call.

At 510, the operation can include issuing a transfer message to one or more computing device or computing appliances. For example, the transfer message can be issued to the computing devices and/or computing appliances identified in the transfer indication in operation 508. In some embodiments, the transfer message can be issued simultaneously to a plurality of devices, while in some embodiments, the transfer message can be issued serially in a particular order associated with one or more rules associated with the alias numbers.

At 512, the operation can include accepting the transfer message at a next computing device or computing appliance. For example, the operation 512 can include providing an indication to a user interface associated with the next computing device or computing appliance (e.g., the device for the call to be transferred). In some embodiments, the acceptance can be provided via a touchscreen, a remote or button, or voice commands. In some embodiments, the transfer message can be accepted by only one computing device or computing appliance, while in some embodiments, the transfer message can be accepted by a plurality of devices and appliances. In some embodiments, a transfer can be initiated and completed by opening a communication line that is currently being used for a communication. For example, if a computing device is communicating via a first alias phone number, a computing appliance can open the communication channel associated with the first alias phone number to effectively transfer the call. In some embodiments, the operation 512 can include transmitting an acceptance message to the network provider indicating that a computing device or a computing appliance has accepted the transfer.

At 514, the operation can include continuing the communication at the next computing device or computing appliance. For example, when a transfer is complete, the user can experience a seamless transition for communicating, in accordance with embodiment of the disclosure.

FIG. 6 illustrates an example process 600 for monitoring a home location and providing alerts in multiple device and multiple line environment, in accordance with embodiments of the disclosure.

At 602, the operation can include assigning an alias number to a monitoring component. In some embodiments, individual monitoring components can be associated with a unique alias number, while in some embodiments, the alias number associated with the monitoring component can be associated with a plurality of monitoring components. In some embodiments, the alias number can be assigned via an interface provided at a computing appliance, a computing device, or a network provider. In some embodiments, the alias number can be assigned via a central administrative page that manages alias number assignments for some or all alias numbers associated with a user account.

At 604, the operation can include determining one or more rules associated with the alias number. In some embodiments, the rules can include determining a group associated with the alias number, and determining an action associated with the alias number, which can be referred to as operations 606 and 608. A group associated with the alias number can include any additional alias numbers, device numbers, computing devices, and/or computing appliances to be contacted upon receiving a communication from the monitoring component. An action associated with the alias number can include a format of a communication that is to be initiated with respect to a particular rule, such as a video call, a SMS, MMS, etc. In some embodiments, an action can include an order of device numbers and/or alias numbers to contact upon receiving a communication. In some embodiments, a communication is transmitted and/or initiated simultaneously to associated alias numbers and device numbers, while in some embodiments, the communications are initiated serially according to the rules defined in the process 600.

At 610, the operation can include receiving an indication from a monitoring component. In some embodiments, the indication can be received at a network provider. At 612, the operation can include determining an action based at least in part on rules, such as the rules defined in the operation 604. At 614, the operation can include providing an action to computing device associated with the alias number. In some embodiments, the action can include initiating a video call or voice call, or sending a SMS or MMS, in accordance with the type of monitoring component, and the rules as discussed herein. For example, in a case where the monitoring component is a video intercom, the action can include establishing a video call with an associated computing device. In a case where the monitoring component is a window sensor, the action can include sending a SMS to an associated computing device when the window is opened or closed.

At 616, the operation can include receiving a response from at least one computing device associated with the alias number. In some embodiments, the response can include an interaction including a voice or video call. In some embodiments, the response can include a command directed to a monitoring component to open a remote door lock, for example. In some embodiments, the response can include a command to control a computing appliance associated with one or more alias numbers. In some embodiments, the response can include a request to transfer the call to another computing device or computing appliance.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
one or more processors;
a memory; and
one or more modules stored in the memory and executable by the one or more processors to perform operations comprising:
associating, by a network provider, a device phone number with a wireless computing device;
receiving a first indication from the wireless computing device to associate an alias phone number with the wireless computing device, wherein the alias phone number is one of a plurality of alias phone numbers associated with a user account, the user account associated with the wireless computing device;
receiving a second indication from the wireless computing device to associate the alias phone number with a computing appliance;
receiving a first request to initiate a voice call at the wireless computing device using the device phone number associated with the wireless computing device;
receiving a second request to initiate a transfer of the voice call from the device phone number to the alias phone number;
transmitting a transfer message to the computing appliance; and
transferring the voice call from the wireless computing device using the device phone number to the computing appliance using the alias phone number.

2. The system of claim 1, wherein the device phone number is associated with an International Mobile Subscriber Identity (IMSI).

3. The system of claim 1, further comprising transmitting the transfer message to a plurality of computing appliances associated with the alias phone number.

4. A system, comprising:
one or more processors;
a memory; and
one or more modules stored in the memory and executable by the one or more processors to perform operations comprising:
receiving, from a computing device associated with a network provider, a first request to place a call from a device number associated with the computing device;
receiving, from the computing device, a second request to transfer the call to an alias number;
receiving, from the computing device, an assignment of the alias number to a computing appliance of one or more computing appliances, the assignment received at the network provider;
determining that the one or more computing appliances are associated with the alias number;
transmitting, to the one or more computing appliances, a transfer message indicating the call is to be transferred to the one or more computing appliances;
receiving, from the computing appliance of the one or more computing appliances, an acceptance of the transfer message; and
transferring the call to the computing appliance.

5. The system claim 4, wherein the determining that the one or more computing devices are associated with the alias number comprises accessing an alias number registration table at the network provider.

6. The system of claim 4, wherein a plurality of alias numbers are associated with the computing device, wherein ones of the plurality of alias numbers are enabled on the computing device via a user interface.

7. The system of claim 4, wherein the operations further comprise registering the alias number with the computing appliance at an alias number registration table at the network provider.

8. The system of claim 4, wherein the computing device is a wireless phone and wherein the computing appliance is selected from a group comprising a television, a refrigerator, a washing machine, or a smart mirror.

9. The system of claim 4, wherein the operations further comprise allocating a plurality of alias numbers to a user account, the user account associated with the computing device.

10. The system of claim 4, wherein the device number is associated with an International Mobile Subscriber Identity (IMSI) provided by the network provider.

11. The system of claim 4, wherein the operations further comprise transmitting the transfer message substantially simultaneously to the one or more computing appliances associated with the alias number.

12. The system of claim 4, wherein the operations further comprise enabling a client application to operate at the computing appliance, the client application associated with one or more alias numbers and configured to receive input from a user at the computing appliance.

13. A computer-implemented method performed by one or more processors configured with specific instructions, the computer-implemented method comprising:

receiving, from a computing device associated with a network provider, a first request to place a call from a device number associated with the computing device;

receiving, from the computing device, a second request to transfer the call to an alias number;

receiving, from the computing device, an assignment of the alias number to a computing appliance of one or more computing devices, the assignment received at the network provider;

determining that the one or more computing appliances are associated with the alias number;

transmitting, to the one or more computing appliances, a transfer message indicating the call is to be transferred to the one or more computing appliances;

receiving, from the computing appliance of the one or more computing appliances, an acceptance of the transfer message; and transferring the call to the computing appliance.

14. The computer-implemented method of claim 13, further comprising registering the alias number with the computing appliance at an alias number registration table at the network provider.

15. The computer-implemented method of claim 13, further comprising allocating a plurality of alias numbers to a user account, the user account associated with the computing device.

16. The computer-implemented method of claim 13, further comprising transmitting the transfer message substantially simultaneously to the one or more computing appliances associated with the alias number.

17. The computer-implemented method of claim 13, wherein a plurality of alias numbers are associated with the computing device, wherein ones of the plurality of alias numbers are enabled on the computing device via a user interface.

* * * * *